United States Patent [19]

Watanabe

[11] Patent Number: 5,111,051
[45] Date of Patent: May 5, 1992

[54] MULTI-ANODE ARRAY PHOTOMULTIPLIER TUBE

[75] Inventor: Mitsuo Watanabe, Shizuoka, Japan

[73] Assignee: Hamamatsu Photonics K. K., Shizuoka, Japan

[21] Appl. No.: 579,675

[22] Filed: Sep. 10, 1990

[30] Foreign Application Priority Data

Sep. 14, 1989 [JP] Japan ................... 1-239190

[51] Int. Cl.$^5$ .................. H01J 43/12; G01T 1/28
[52] U.S. Cl. ................. 250/363.02; 250/207
[58] Field of Search ............ 250/363.02, 207; 313/532, 533

[56] References Cited

U.S. PATENT DOCUMENTS 4,703,168 10/1987 Olson ........................ 250/207

FOREIGN PATENT DOCUMENTS 63-300986 12/1988 Japan .

OTHER PUBLICATIONS

Kume et al., "Position Sensitive Photomultiplier Tubes For Scintillation Imaging" IEEE Trans. On Nuclear Science vol. NS-33, No. 1, Feb. 86, p. 448.

Hayashi, "New Photomultiplier Tube for Medical Imaging", IEEE Transactions on Nuclear Science, vol. 36, No. 1, Feb. 1989, pp. 1078-1083.

Suzuki et al., "New Position Sensitive Photomultiplier Tubes for High Energy Physics and Nuclear Medical Applications", IEEE Transactions on Nuclear Science, vol. 35, No. 1, Feb. 1988, pp. 382-386.

Primary Examiner—Janice A. Howell
Assistant Examiner—Richard Hanig
Attorney, Agent, or Firm—Finnegan, Henderson, Farabow, Garrett, and Dunner

[57] ABSTRACT

A photomultiplier tube has a multi-anode array consisting of a first group of anodes arranged in the Y-direction and a second group of anodes arranged in the X-direction in the form of a plurality of rows. Each of the anodes of the first group for detecting a receiving position of photoelectrons in the Y-direction contains the associated anodes of the second group for detecting the receiving position of photoelectrons in the X-direction so as to form an empty space therebetween.

9 Claims, 6 Drawing Sheets

FIG. 7(c)
PRIOR ART
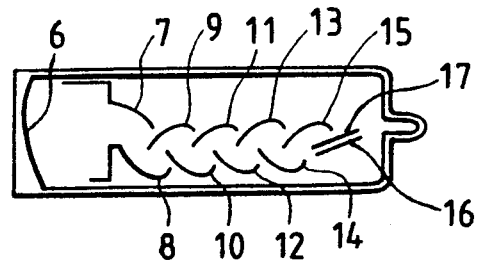
FIG. 7(a)
PRIOR ART
FIG. 7(b)
PRIOR ART
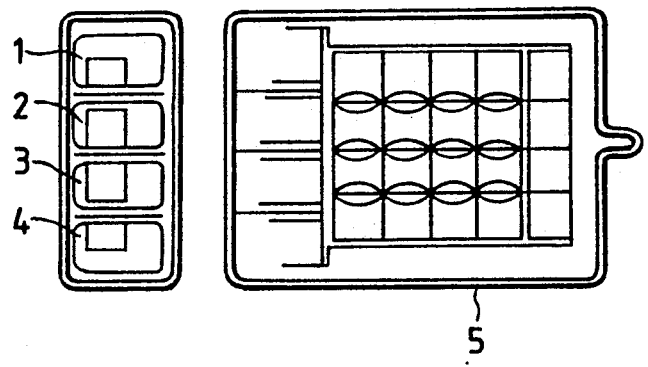
FIG. 8
PRIOR ART
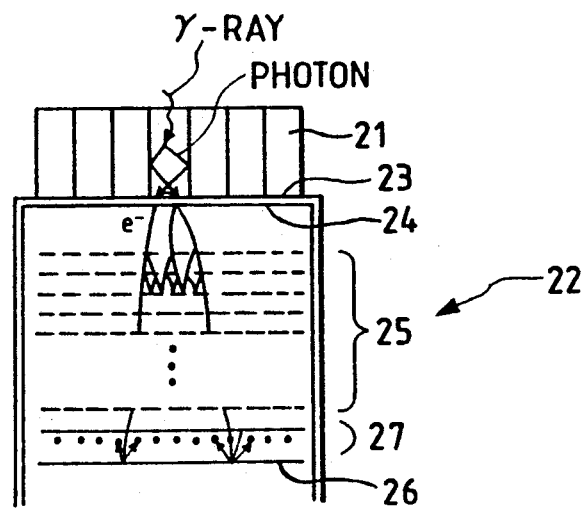

5,111,051

MULTI-ANODE ARRAY PHOTOMULTIPLIER TUBE

BACKGROUND OF THE INVENTION

This invention relates to a photomultiplier tube (PMT) which detects low-level incident light by electron multiplication. More particularly, it relates to a PMT that detects the incident position of low-level light by means of a multi-anode array.

PMTs of the type contemplated by the present invention are used, for example, in radiation detectors in positron computed tomography (CT) apparatus. A radiation detector is generally composed of discrete crystals and a single PMT. The crystals emit light upon illumination of a radiation and the emitted light is subjected to photoelectric conversion and electron multiplication. The anodes in the PMT detect the incident position of the radiation. FIGS. 7 and 8 show the PMTs used in the radiation detectors, which are described in IEEE Transactions on Nuclear Science, Vol. 36, No. 1, February, 1989.

Part (a) of FIG. 7 is a side view of a multi-segment PMT, part (b) is its front view, and part (c) is its plan view. PMT generally indicated by 5 is composed of four separate segments 1–4 and the light incident on a photocathode 6 is intensified in each of the segments 1–4. In other words, the photoelectrons generated by photoelectric conversion from the photocathode 6 are multiplied by secondary emission through the sequence of dynodes 7–16 so that they can be detected by an anode 17. The incident position of light can be identified by knowing which of the four segments 1–4 contains the anode 17 having detected the photoelectrons.

FIG. 8 shows the construction of a mosaic BGO radiation detector that is composed of a plurality of crystals 21 and a single position-sensitive PMT 22. When a certain crystal 21 is illuminated with a γ-ray, photons are generated and pass through a window 23 to strike a photocathode 24. The resulting photoelectrons are multiplied by mesh dynodes 25 and the last dynode 26, and the incident position of the γ-ray is detected by a multi-wired anode 27 of an X/Y-crossed configuration.

The conventional radiation detectors described above are economical, since they use only one PMT 5 or 22 and more than one detector need not be used. However, in order to detect the entry position of incident light with high precision, a single PMT must be divided into many segments. As for the PMT 5 shown in FIG. 7, it is very difficult to separate a single PMT into many segments by the current electron tube technology. As for the PMT 22 shown in FIG. 8, it is possible to detect the incident position of light with fairly high precision but this requires a complex computing circuit for determining the incident position. As a result, the response speed of the detector slows down and the count rate of incident radiations decreases.

SUMMARY OF THE INVENTION

The present invention has been accomplished in order to solve the aforementioned problem of the prior art and it provides a photomultiplier tube comprising a photocathode for converting incident light to photoelectrons, dynodes for multiplying said photoelectrons, and an anode array for collecting the multiplied photoelectrons, which anode array consists of a first group of anodes, arranged in a first direction, for detecting a receiving position of photoelectrons in said first direction, and a second group of anodes, arranged in a second direction perpendicular to said first direction so as to be associated with each of the anodes of the first group, for detecting a receiving position of photoelectrons in said second direction.

In accordance with the present invention, the incident position of light is identified by detecting photoelectrons with the second group of anodes for each of the anodes of the first group.

BRIEF DESCRIPTION OF THE DRAWINGS

FIG. 7(a), 7(b) and 7(c) show the construction of a prior art multi-segment PMT's; and FIG. 8 shows a prior art mosaic BGO radiation detector.

DETAILED DESCRIPTION OF THE PREFERRED EMBODIMENTS

Figure 2A:
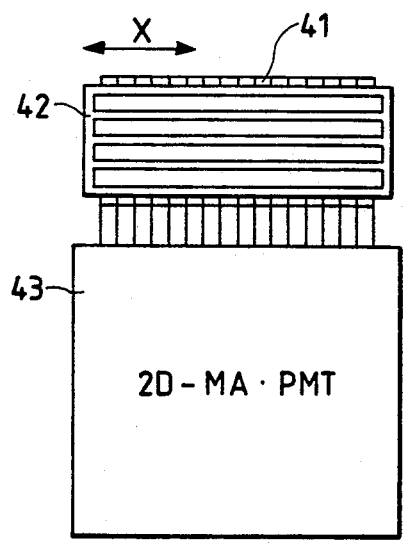
FIGS. 2(a) and 2(b) show the construction of a crystal section used in combination with the first embodiment.
Figure 2B:
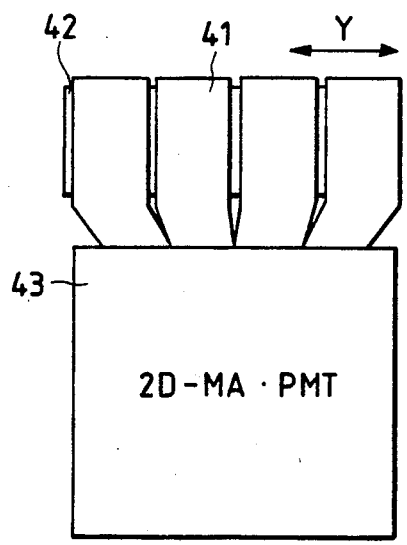

FIG. 2 shows a radiation detector in a positron CT apparatus, to which a PMT according to a first embodiment of the present invention is applied. Part (a) of FIG. 2 is a front view of a crystal section of this radiation detector, and part (b) is its side view. Discrete crystals are in the form of a bismuth germanate (BGO) array 41, which consists of blocks each divided into 16 crystals in the X-direction as shown in part (a). Four blocks each consisting of 16 crystals are arranged in the Y-direction as shown part (b). Thus, a plurality of crystals are arranged in a two-dimensional array in both the X- and Y-directions which correspond to the circumferential and slicing directions, respectively, of a positron CT apparatus. An avalanche photodiode (APD) array 42 is fixed to a lateral side of each block of the BGO array 41. The APD array 42 is composed of four APD devices that are arranged in the depth direction of radiation incidence. The BGO array 41 is fixed to the input side of a two-dimensional multi-anode (2D-MA) PMT 43.

Figure 1A:
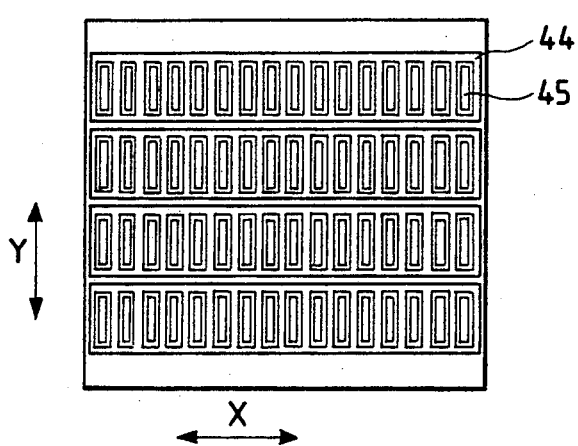
FIGS. 1A and 1B show the pattern of a multi-anode array according to a first embodiment of the present invention.
Figure 1B:
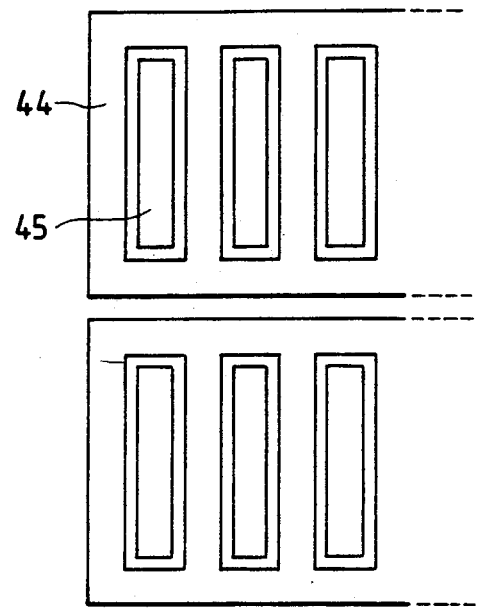

FIG. 1A shows the pattern of a multi-anode array of the 2D-MA PMT 43, and FIG. 1B is a partial enlarged view of this pattern. The multi-anode array for collecting accelerated photoelectrons is formed on the output side of the PMT 43 and is a two-dimensional array of a first group of Y anodes 44 and a second group of X anodes 45. In other words, the Y anodes 44 are arranged in the form of four rows in the specified Y-direction for detecting the incident position of photoelectrons in that Y-direction. Sixteen X anodes 45 are arranged in the X-direction which is perpendicular to the Y-direction so as to be associated with each Y anode 44, and they detect the incident position of photoelectrons in that X-direction. Thus, a total of 16×4=64 anodes are used as the X anodes 45.

The Y anodes 44 that are arranged at relatively large intervals in the Y-direction are electrically isolated from one another by an empty space to form 4 segments. The X anodes that are arranged at relatively small intervals in the X-direction are surrounded by each Y anode 44 with an empty space left on the periphery, and are electrically isolated from the corresponding Y anode 44. A slice collimator (not shown) is provided between the adjacent Y anodes 44. The multi-anode array is attached to the faceplate of the PMT 43 such that the center of each of the 16 X anodes 45 coincides with the center of each of the 16 crystals of the BGO array 41.

The multi-anode pattern has an outside dimension of 66 mm×62 mm. The X anode 45 is formed as a rectangle with the size of 8.8 mm×1.5 mm, and the Y anode 44 is formed as a rectangle with the size of 65.5 mm×12.8 mm. In each segment, the total area of the 16 X anodes 45 is equal to the area of the Y anode 44 so that the X anodes 45 will generate the same quantity of signal as the Y anode 44 in each segment.

Figure 3:
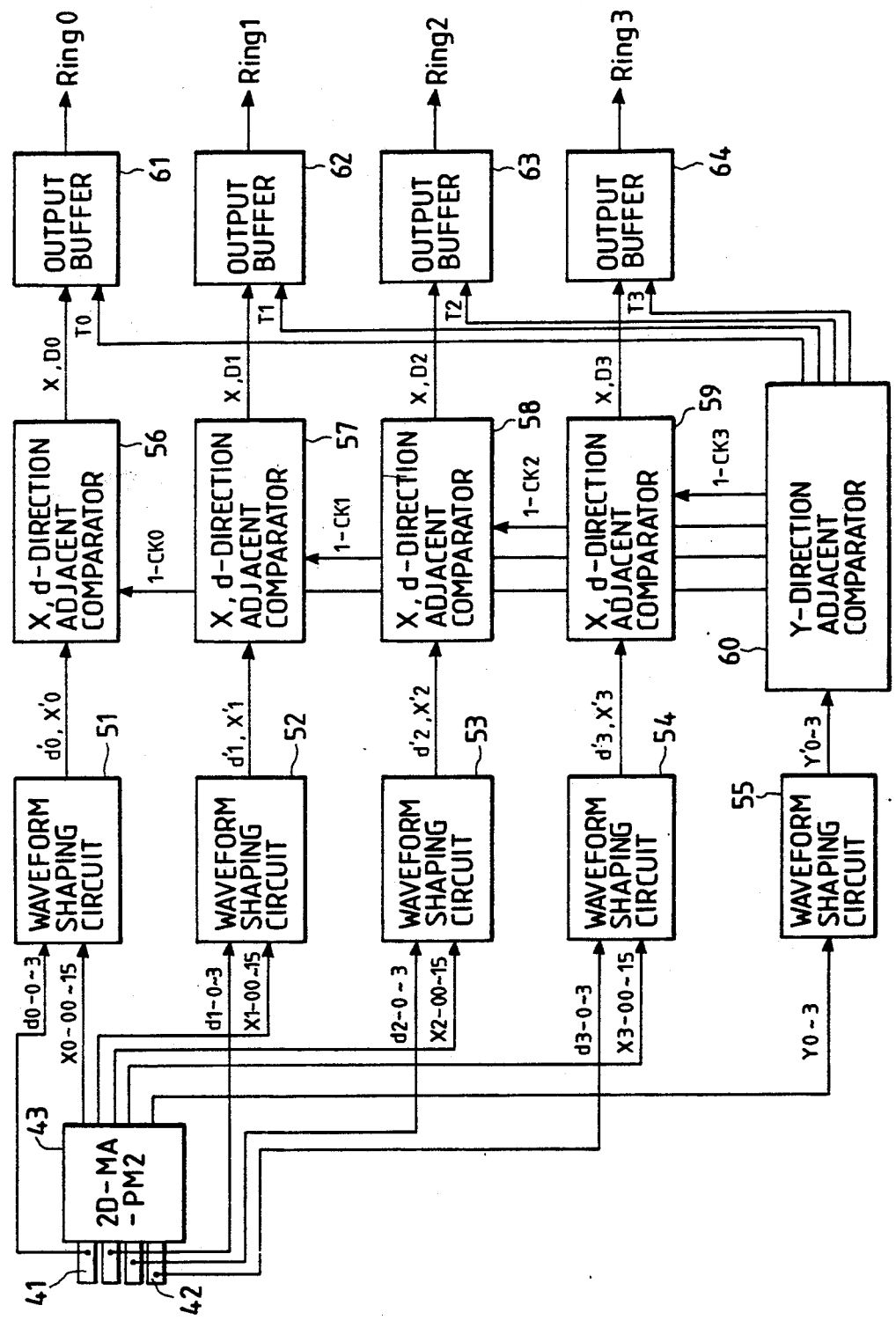
FIG. 3 is a block diagram showing a radiation detector to which the PMT of the first embodiment is applied.
Figure 9:
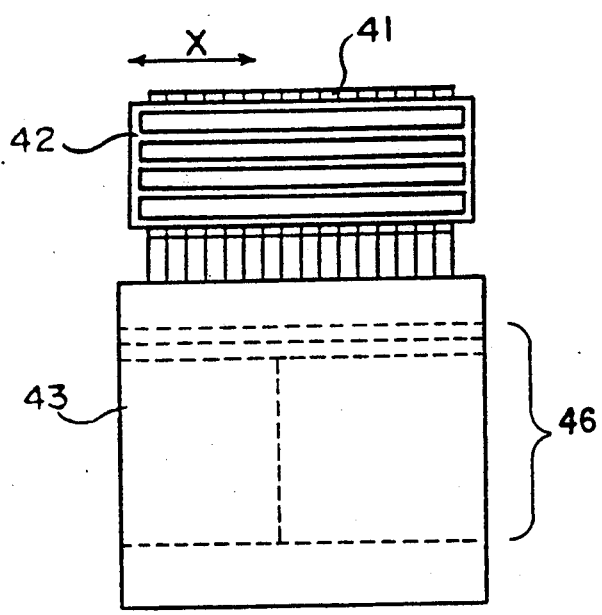
FIG. 9 shows the crystal construction section and dynodes.

FIG. 3 is a block diagram showing the overall configuration of the radiation detector. When a γ-ray is incident on the BGO array 41, it emits light at the incident position. The emitted light is subjected to photoelectric conversion by the PMT 43, which also multiplies the resulting photoelectrons as accomplished by the dynodes 46 shown in FIG. 9 before they are supplied to the multi-anode array described above. The multi-anode array outputs an electric signal that represents the information on the two-dimensional incident position of a γ-ray. Stated more specifically, the X anodes 45 output electric signals X0, X1, X2 and X3 that correspond to the respective blocks of the BGO array 41. Each signal X consists of 16 signal components (X-00 to X-15) that correspond to the 16 crystals of the BGO array 41. The Y anodes 44 output an electric signal Y which consists of 4 signal components (Y0 to Y3) that correspond to the 4 crystal blocks. At the same time, the depth information of the incidence of a γ-ray is detected by the APD arrays 42, and the four APD arrays 42 output electric signals d0, d1, d2 and d3. Each signal d consists of 4 signal components (d-o to d-3) that correspond to the four APD devices arranged in the depth direction.

The signals X from the multi-anode array and the signals d from the APD arrays 42 are supplied to waveform shaping circuits 51-54 for each block of the BGO array 41, whereas the signal Y from the multi-anode array is supplied to a waveform shaping circuit 55. The signals supplied to the shaping circuits 51-55 are amplified and thereafter clipped to produce shaped outputs. The signals d, and X, produced from the shaping circuits 51-54 are supplied to X, d-direction adjacent comparators 56-59, in which the output signals from the adjacent APD devices or those from the adjacent X anodes 45 are subjected to comparison in the manner to be described below. As a result, the γ-ray incident position of the BGO array 41 is detected for both the depth and X-directions. The signal Y' produced from the shaping circuit 55 is supplied to a Y-direction adjacent comparator 60, in which the timing of radiation incidence is picked off and its energy is discriminated. Furthermore, the output signals from the adjacent Y anodes 44 are compared in the manner described below so that the incident position of a γ-ray is detected for the Y-direction.

The detected information on the incident position in the Y-direction is supplied as signals 1-CK0 to 1-CK3 to the X, d-direction adjacent comparators 56-59, respectively. Receiving these signals, the adjacent comparators 56-59 supply respective information output buffers 61-64 with the information on the incident position of a γ-ray. The information output buffers 61-64 correspond to the respective ring outputs (Ring 0 to Ring 3) of a positron CT apparatus. The respective pieces of information are latched by timing signals T0-T3 from the adjacent comparator 60, and an encoded address signal of 4 bits in the X-direction and 2 bits in the depth direction is produced from each of the buffers 61-64 as a final output signal together with the associated timing signal.

Figure 4:
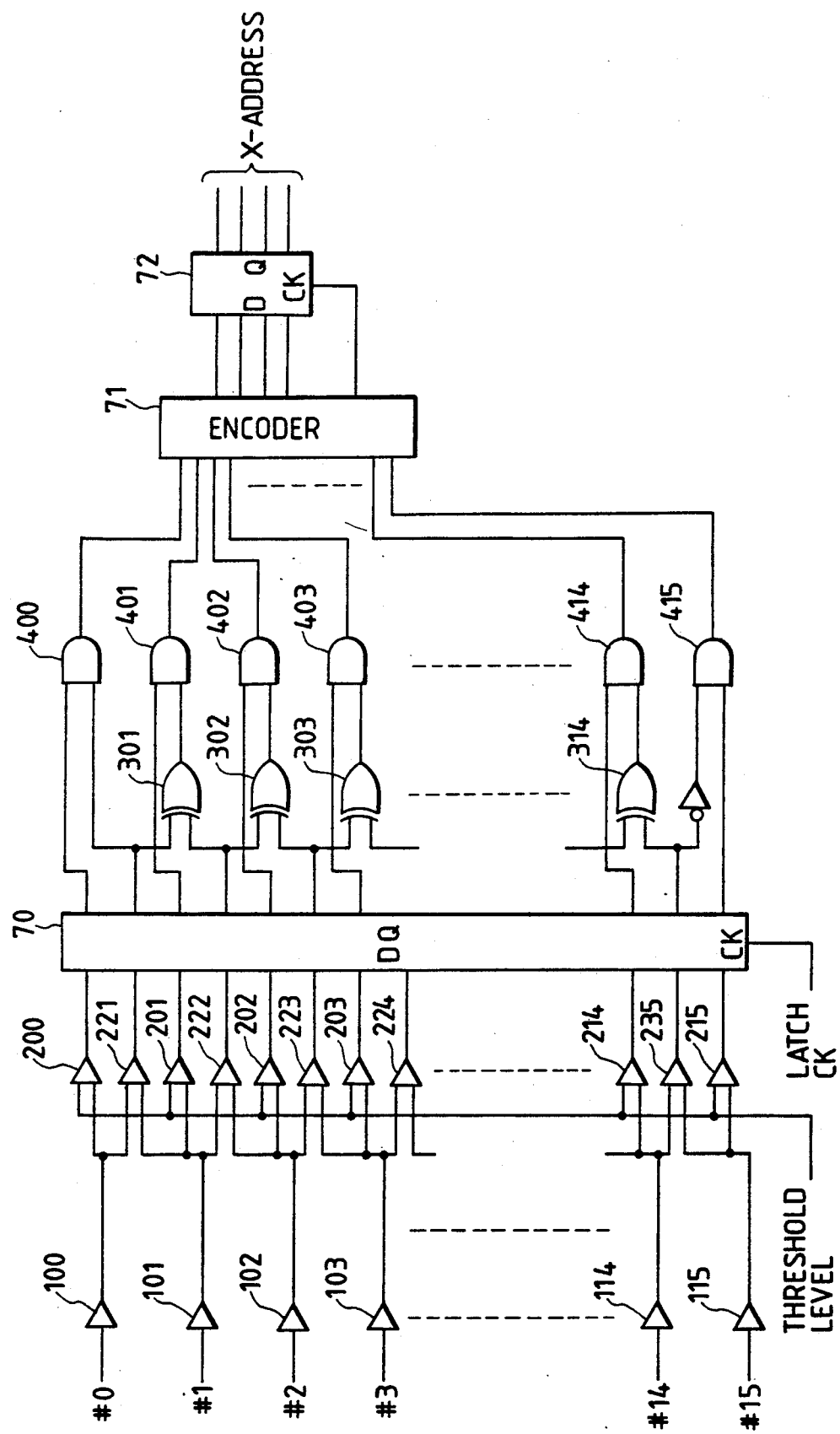
FIG. 4 is a circuit diagram for position detection by adjacent comparators used in the radiation detector of FIG. 3.

FIG. 4 is a circuit diagram of a detector incorporated in each of the adjacent comparators 56-59 to perform position detection in the X-direction. The signals produced from the 16 anodes #0 to #15 of the X anodes 45 are amplified by amplifiers 100-115. The amplified signals are fed to comparators 200-215 that selectively produce signals above a predetermined threshold level, which are then latched in a latch circuit 70. Comparators 221-235 compare the output signals from the adjacent ones of the anodes #0-#15 and the output signals from these comparators are also latched in the latch circuit 70.

Figure 5:
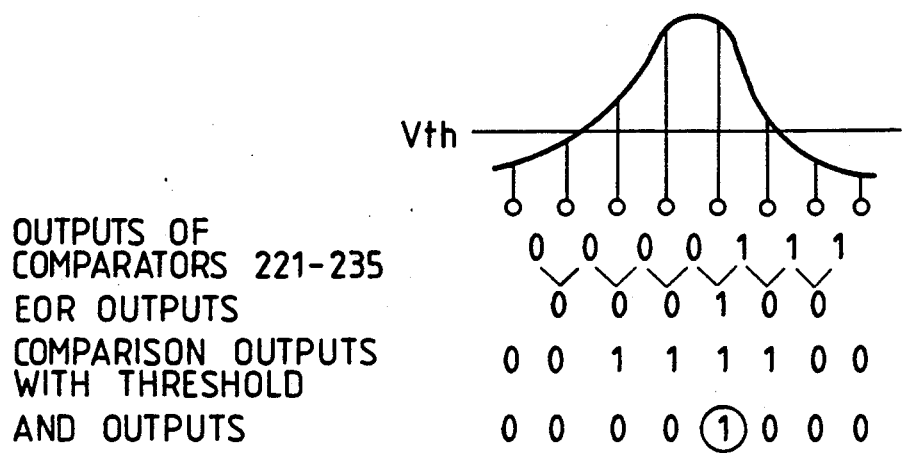
FIG. 5 is a diagram illustrating computing operations performed by the circuit shown in FIG. 4.

Suppose here that an input having the waveform shown in FIG. 5 is fed into the circuit shown in FIG. 4. Comparators 221-235 produce the outputs that are also shown in FIG. 5, and every two adjacent outputs are compared in EXCLUSIVE-OR (EOR) gates 301-314. As a result of this comparison, the position where the EOR output is "1", or where the comparator output changes from "0" to "1", is detected. In this case, only the EOR output corresponding to the anode that is located nearest to the peak point will become "1". The logical multiplication of the EOR outputs and the corresponding outputs of comparison with the threshold level is computed by AND gates 400-415, whereby one of the 16 anodes #0-#15 is selected as an anode outputting a peak value. If the selected signal is an effective output larger than the threshold level, it is converted to an address signal by an encoder 71 and a 4-bit address signal is produced from a latch circuit 72.

The foregoing description only refers to the detection of the incidence position in the X-direction, but essentially the same principle will apply to the detection in the depth (d) direction and the Y-direction and detailed description in this respect need not be made.

The signals detected by the multi-anode array and the APD arrays 42 have certain distribution curves due to the spread of electrons. Nevertheless, by performing computation with the adjacent comparators having the simple construction described above, the peak point for the respective directions can be detected rapidly and without error and, as a result, the incident position of a γ-ray can be correctly discriminated for each of the 4 segments in the Y-direction, with 16 divisional units in the X-direction and 4 divisional units in the depth direction.

Further, parallel processing is achieved for the 4 segments in the Y-direction and this offers the following advantage. If γ-rays are simultaneously incident at two positions on the radiation detector having the multi-wired anode array consisting of the X/Y-crossed configuration which is used in the PMT 22 shown in FIG. 8, two peak values occur in the wired anodes in the X- and Y-directions. As a result, two of the outputs from AND gates, which are like the AND gates 400–415 in the position detector circuit of FIG. 4, for either direction will have the value "1", whereby it becomes impossible to detect the correct incident position in either direction. However, this problem is absent from the first embodiment described above. Even if simultaneous incidence of two γ-rays occurs, incident positions of the two γ-rays can be discriminated from each other since the Y anodes 44 which are electrically isolated from one another permit parallel computing operation to be carried out for the 4 segments in the Y-direction.

Further, the APD arrays 42 permit the information on the γ-ray incident position to be gathered in the depth direction, which contributes to more exact detection of the incident position of a γ-ray.

Figure 6A:
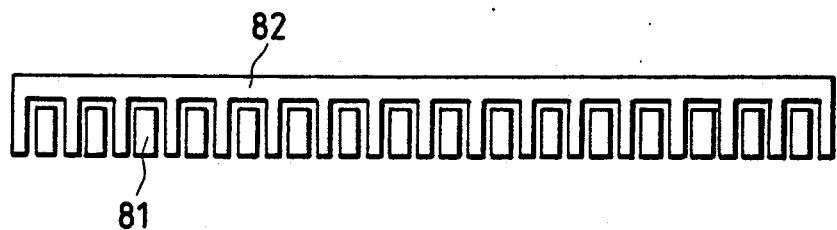
FIGS. 6A and 6B show the pattern of multi-anode arrays according to the other embodiments of the present invention.
Figure 6B:
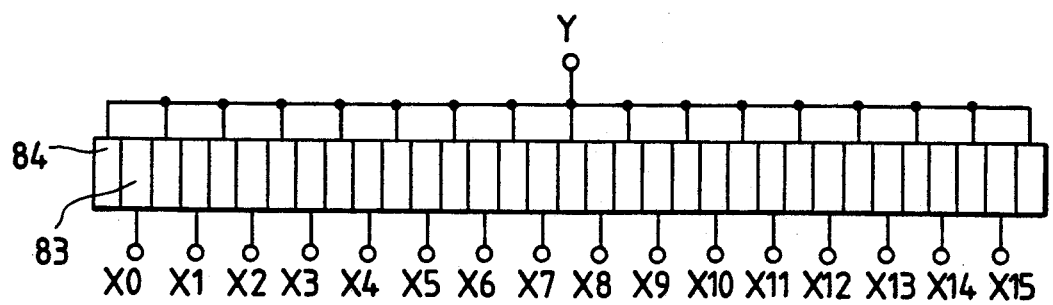

The foregoing description of the first embodiment of the present invention assumes the use of the multi-anode array having the configuration shown in FIGS. 1A and 1B. It should, however, be noted that the same results can be attained by using multi-anode arrays having the configurations shown in FIGS. 6A and 6B. FIG. 6A shows one segment in which X anodes 81 and a Y anode 82 are arranged in a comb-shaped pattern, with each X anode being spaced from the Y anode by an empty area. FIG. 6B shows one segment in which X anodes 83 alternate with Y anodes 84 via insulator films, with the Y anodes 84 being electrically interconnected.

The description of the first embodiment also assumes the use of 4 segments in the Y-direction, but the same results can be attained even if the number of segments in the Y-direction is greater or less than four.

As described on the foregoing pages, the present invention discriminates the incident position of light on the PMT by detecting photoelectrons with the second group of anodes for each of the anodes of the first group. This offers the advantage that a single PMT can be divided into many seguments in an easy and economic way. Further, the computing circuit for determining the incident position of light on the PMT is simplified, offering the added advantage that the detector has an increased response speed with an associated improvement in the count rate of incident radiations.

I claim:

1. A photomultiplier tube comprising:
a photocathode for converting incident light into photoelectrons;
a plurality of means for multiplying the photoelectrons; and
an anode array for collecting the multiplied photoelectrons, the anode array comprising a first group of anodes, arranged in a first direction, for detecting a receiving position of the photoelectrons in the first direction, and a second group of anodes, electrically isolated from each other and arranged in a second direction perpendicular to the first direction in the form of a plurality of rows so as to be associated with the respective anodes of the first group, for detecting the receiving position of the photoelectrons in the second direction simultaneously with the detection in the first direction.

2. A photomultiplier tube according to claim 1, wherein each anode of the first group is arranged in substantially the same plane as the associated anodes of the second group and contains the associated anodes of the second group so as to form an empty space therebetween.

3. A photomultiplier tube according to claim 1, wherein each anode of the first group is arranged in substantially the same plane as the associated anodes of the second group and has a comb shape, and the associated anodes of the second group are arranged between teeth of the comb shape so as to form an empty space.

4. A photomultiplier tube according to claim 1, wherein each anode of the first group comprises a plurality of sections arranged in the second direction and electrically interconnected, and the associated anodes of the second group are arranged between the sections of the anode of the first group via insulator films.

5. A photomultiplier tube according to claim 1, wherein the anodes of the first group are regularly arranged in the first direction with a first predetermined interval, and the anodes of the second group are regularly arranged in the second direction with a second predetermined interval which is smaller than the first predetermined interval.

6. A photomultiplier tube according to claim 1, wherein said means for multiplying the photoelectrons comprises:
a plurality of dynodes.

7. A radiation detector comprising:
a scintillator array comprising a plurality of scintillator crystals, arranged in a first and a second direction perpendicular to each other, for emitting scintillation light in response to an incident radiation;
a photomultiplier tube comprising:
a photocathode for converting the scintillation light to photoelectrons;
a plurality of dynodes for multiplying the photoelectrons; and
an anode array for collecting the multiplied photoelectrons, the anode array comprising a first group of anodes, arranged in said first direction, for detecting a receiving position of the photoelectrons in said first direction, and a second group of anodes, electrically isolated from each other and arranged in said second direction in the form of a plurality of rows so as to be associated with the respective anodes of the first group, for detecting the receiving position of the photoelectrons said second direction, the anode array being arranged so that centers of the anodes substantially coincide with centers of the corresponding scintillator crystals; and
a computing circuit for determining a scintillation position in said first and second directions on the basis of detection data for said first and second directions provided from the photomultiplier tube, a computing operation for said second direction being performed in a parallel manner for sets of the detection data for said first direction which corresponds to the respective anodes of the first group.

8. A radiation detector according to claim 7, further comprising a plurality of photodetector arrays, each array being fixed to a side surface of the scintillator crystals arranged in a row in said first direction and each array comprising a plurality of photodetectors arranged in the third direction corresponding to a depth direction of the scintillator array, for detecting the scintillation position in the depth direction, wherein the computing circuit further determines the scintillation position in the depth direction on the basis of detection data in the depth direction provided from the plurality of photodetector arrays.

9. A radiation detector according to claim 8, wherein each of the photodetectors is an avalanche photodiode.

* * * * *

UNITED STATES PATENT AND TRADEMARK OFFICE
CERTIFICATE OF CORRECTION

PATENT NO. : 5,111,051
DATED     : May 05, 1992
INVENTOR(S) : Mitsuo Watanabe

It is certified that error appears in the above-identified patent and that said Letters Patent is hereby corrected as shown below:

Claim 6, column 6, line 42, after "photoelectrons" insert --in--.

Signed and Sealed this

Twenty-eighth Day of September, 1993

Attest:

BRUCE LEHMAN

Attesting Officer

Commissioner of Patents and Trademarks